July 18, 1961 — F. O. LUENBERGER — 2,993,132
SUBMERSIBLE MOTOR
Filed Oct. 7, 1957 — 2 Sheets-Sheet 1

INVENTOR.
FREDERICK O. LUENBERGER
BY
Hann and Hann
ATTORNEYS.

July 18, 1961 F. O. LUENBERGER 2,993,132
SUBMERSIBLE MOTOR
Filed Oct. 7, 1957 2 Sheets-Sheet 2

INVENTOR.
FREDERICK O. LUENBERGER
BY
Flam and Flam
ATTORNEYS.

United States Patent Office 2,993,132
Patented July 18, 1961

2,993,132
SUBMERSIBLE MOTOR
Frederick O. Luenberger, Los Angeles, Calif., assignor to U.S. Electrical Motors, Inc., Los Angeles, Calif., a corporation of California
Filed Oct. 7, 1957, Ser. No. 688,745
3 Claims. (Cl. 310—87)

This invention relates to induction motors, and particularly to motors adapted to be submerged in a well.

In such motors, it is common to provide a sealing tube, mechanically isolating the stator windings from the other parts of the motor. The tube is thin and of non-magnetic material, sealingly engaging the inner periphery of the stator core.

The interior of the motor, including the rotor, the shaft and its bearings, is sealed at the ends of the motor casing. A liquid filling is provided for this portion of the motor. The liquid may consist of a mixture including water and liquid for preventing corrosion.

A large amount of heat is generated internally of the motor, due to the flow of current in both the stator and the rotor. This heat, especially when the motor is of large size, may not be adequately dissipated to the exterior of the motor.

It is one of the objects of this invention to increase the heat exchange between the interior and exterior of the motor, so that the motor may operate at a tolerable temperature.

In order to accomplish this result, use is made of the liquid filling to absorb heat from the motor; and the liquid is circulated as by an auxiliary pump, to a heat exchanger that transmits the heat to the exterior of the motor casing. Accordingly, it is another object of this invention to make use of the liquid in the casing for effecting this heat exchange.

The liquid filling the casing also serves to lubricate the bearings. It is another object of this invention to provide a lubricating system that will keep the journal bearing surfaces flushed with clean lubricant derived from the liquid in the casing.

It is also another object of this invention to provide self-aligning bearings in connection with a structure of this character and particularly by the aid of coacting spherical surfaces between the bearing sleeve and the stationary bearing support.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings.

Figure 1:
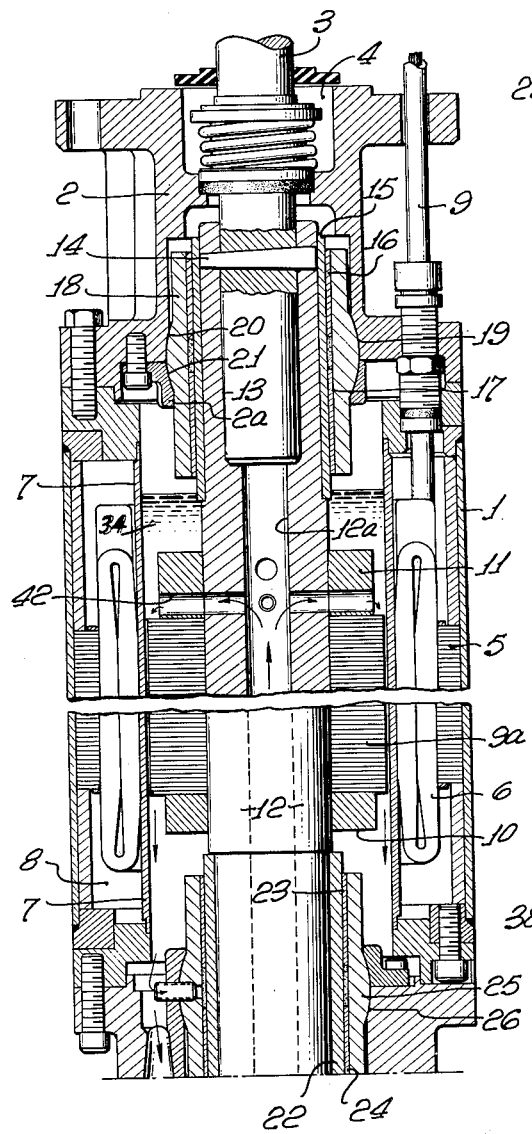
FIGURE 1 is a vertical sectional view of the upper half of a submersible motor construction embodying the invention, the motor being shortened in order to reduce the size of the figure.

Since many of the elements illustrated in the drawings are conventional and well-known, a detailed description of these elements is considered unessential.

Thus, for example, a sealed casing structure is formed by aid of a casing section 1 which encloses the stator and rotor structures of the electric motor. This casing section 1 is joined in any appropriate manner to an upper cover member 2 through which a shaft section 3 extends. An appropriate seal structure 4 is provided to prevent ingress or egress of liquid into the casing.

The section 1 supports the stator laminations 5 in which the stator windings 6 are accommodated. For providing a space sealed against ingress of liquid for the stator structure 5—6, there are provided tubular members 7 of non-magnetic material cooperating with the laminations 5 to provide a sealed space 8. Leads for the stator windings are accommodated in a conduit structure 9, extending out of the casing structure.

Surrounded by the stator structure 5, there is rotatable a rotor including the laminations 9a and a squirrel cage winding. These laminations are compressed by the aid of a lower collar 10 and an upper collar 11 mounted upon a hollow shaft structure 12. This hollow shaft structure has an enlarged bore 13 at its upper end which is joined as by a taper pin 14 to the lower end of the shaft 3. The shafts 3 and 12 are thus in driving relation with each other.

The upper end of the shaft 12 carries a stainless steel sleeve 15 which cooperates with Babbitt-lined sleeves 16 and 17 appropriately mounted in a bearing standard or shell 18. This shell 18 is provided with an exterior spherical surface 19 appropriately mounted for universal movement within the seats 20 and 21 formed in cover 2 and collar 2a. The spherical joint permits the shaft structure 3—12 to align itself properly.

A similar bearing structure is located adjacent the bottom of the rotor structure 9a. This bearing structure includes a stainless steel sleeve 22 carried by the lower portion of the shaft 12 and journaled in the Babbitt-lined sleeves 23 and 24. The shell 25 has a spherical surface 26 (FIG. 2) cooperating with the spherical socket 27 formed by non-rotary elements of the structure, similar to parts 2 and 2a for the upper bearing structure.

Figure 1A:
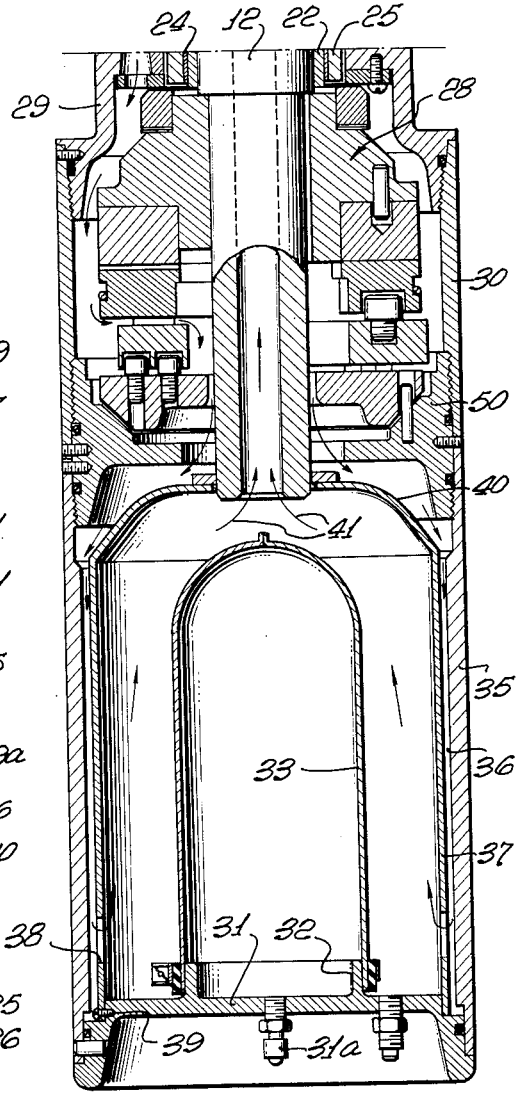
FIG. 1a is a vertical sectional view of the lower half of the motor structure.

The lower end of the shaft 12 is shown in FIG. 1a. It is supported on a step bearing structure 28 of the Kingsbury type.

A tubular member 29 serves to couple the casing section 1 to a lower casing section 30. This tubular member extends around the region of the lower journal bearing, and provides a portion of the spherical socket for standard 26. It also forms a liquid passage between the casing sections.

The casing structure 1, 2, 29 and 30 at its lower end is sealed by a cover member 31 having an internal flange 32. A flexible bulb or tube 33, capable of expanding and contracting to compensate for temperature and pressure variations of the liquid filling 34, is sealingly supported at its base on flange 32; its interior is in communication with external fluid as by fitting 31a.

Below the step bearing 28, a collar 50 is supported by the casing structure. It provides a support for bearing 28, as well as a clearance aperture for the lower end of shaft 12. A body of liquid 34 fills the entire casing structure. Appropriate passages, as heretofore explained, provide communication from the upper end of the casing structure to the lower section 30.

The liquid 34 may include water and other components that would retard corrosion and deterioration of the surfaces exposed to the liquid. It may also be used as a lubricant for the various bearing parts.

Under load, the motor structure will generate a substantial amount of heat. This heat must be dissipated in order to ensure against intolerable temperature rise in the motor parts.

For this purpose, the lower tubular portion 35 of the casing section 30 is formed as a heat exchanger. It is purposely made of metal of good heat-conducting properties. There is a circulation of the liquid 34 past the interior surface of this heat exchanger 35. The exterior surface is exposed to the external fluid in which the motor is submerged.

In order to form a circulatory path for the liquid, an annular space 36 is provided between the interior surface of the exchanger 35 and the exterior surface of a hollow cylindrical member 37. This hollow cylindrical member communicates with the annular space 36 via several apertures 38 adjacent the lower end of space 36. This hollow member 37 is mounted as by the aid of the screws 39 on a shoulder formed in the interior of cover 31.

The upper end 40 of member 37 is dome-shaped and has a clearance aperture through which the lower end of the shaft 12 extends.

A slight pressure differential is caused to be exerted upon the liquid to cause it to flow through a path including the motor air gap, where the heat generated by the current is apt to be concentrated. The circulatory path is represented by the arrows 41.

For providing this pumping action, the collar 11 has several radial apertures 42 extending above the rotor structure including the laminations 9a. These radial apertures being transverse to the bore 12a through the hollow shaft 12, produce a pumping action as the shaft rotates, throwing the liquid 34 radially outwardly by centrifugal force, and through the air gap between the stator structure 5 and the rotor structure, including the laminations 9a. Thence the liquid 34 is caused to pass downwardly through the annular space 36 in good heat exchanging relationship with the member 35. Thence it passes through apertures 38, upwardly through the cylindrical member 37, and from the cylindrical member 37 upwardly through the hollow shaft 12.

Because the liquid 34 passes through the narrow annular passage 36, it transfers its heat quite rapidly to the member 35, whence it is dissipated externally of the casing structure.

Figure 2:
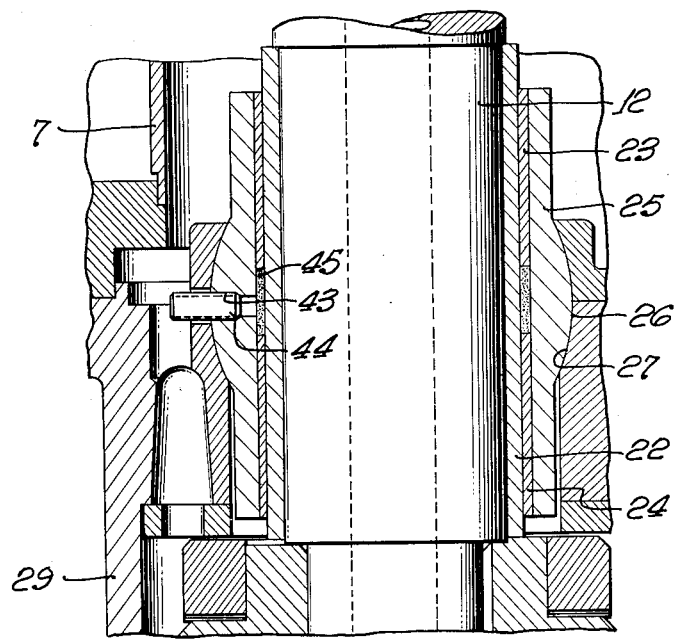
FIG. 2 is an enlarged fragmentary sectional view through one of the journal bearing structures and the motor shaft.
Figure 3:
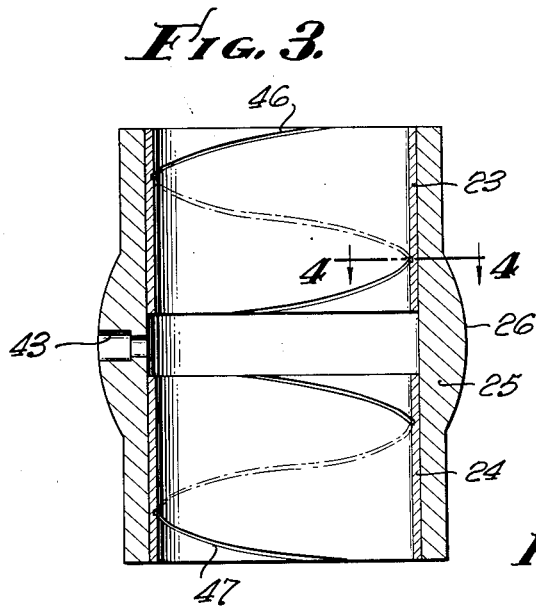
FIG. 3 is an enlarged sectional view, similar to FIG. 2, but omitting the shaft.
Figure 4:
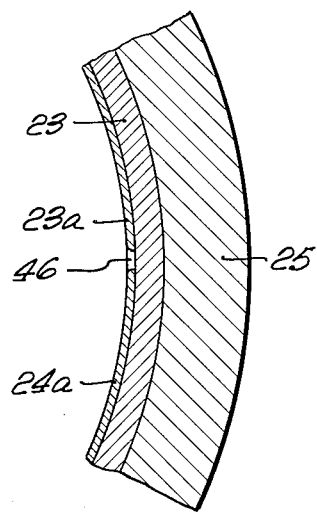
FIG. 4 is a fragmentary enlarged cross-sectional view, of a bearing sleeve, showing the grooved Babbitt lining therein.

The Babbitt-lined sleeves 16 and 17 for the upper bearing structure, and the Babbitt-lined sleeves 23 and 24 for the lower bearing structure are so arranged as to provide distribution of the liquid 34 to the contacting journal bearing surfaces formed by sleeves 15 and 24. FIGS. 2, 3 and 4 illustrate how this is accomplished for the lower journal bearing structure.

The shell or standard 25 is provided with several radial apertures 43 in each of which there is inserted a tubular conduit 44. Conduits 44 are open at their outer ends for passage of the liquid to the space between the spaced ends of bearing sleeves 23 and 24. This space may be filled with an appropriate filter sleeve 45, such as a felt pad.

Each sleeve 23 and 24 is provided with an internal bearing surface, as by the aid of Babbitt linings 23a and 24a (see FIG. 4).

In order to distribute the liquid to the journal bearing surfaces, the internal surface of the linings 23a and 24a is provided with a spiral or helical groove 46, 47. These helical grooves are of opposite hand. Thus, assuming the groove 46 progresses with a right-hand pitch, the groove 47 progresses with a left-hand pitch. Both grooves start from the adjacent sleeve ends, and near the apertures 43. The pitches, of course, are so arranged that upon proper direction of rotation of the shaft 12, the liquid 34 will be urged in opposite directions through the grooves 46, 47 and past the exterior periphery of stainless steel sleeve 22.

The flow of lubricative liquid outwardly in both directions from the central aperture 43 takes place independently of the circulation of the liquid through annular space 36. This occurs since the pressure differential caused by the provision of the grooves 46, 47 is somewhat greater than that produced by the centrifugal action upon the liquid in the radial apertures 42.

The inventor claims:

1. In a submersible electric motor having a substantially cylindrical casing adapted to be vertically inserted in a well or the like, a rotor structure including a shaft, and liquid filling at least part of the casing, the combination therewith of: a journal bearing for one end of the rotor shaft, including a generally tubular shell having peripherally formed thereof and intermediate its length a spherical surface in the form of an equatorial zone, the center of curvature of the surface falling at the axis of the shell; means carried by the casing for supporting the shell at said surface for universal type movement; a pair of axially spaced bearing sleeves lining the interior of said shell and having opposite hand spiral grooves extending respectively from the opposed inner ends of the sleeves to the outer ends of the sleeves; said grooves being formed on the interior journal surfaces of the sleeves; means establishing communication between the spaced ends of the sleeves and the interior of the casing; the shaft pumping the liquid in the casing from the inner opposed ends of the sleeves to the outer end thereof.

2. In a submersible electric motor having a substantially cylindrical casing adapted to be vertically inserted in a well or the like, a rotor structure including a shaft, liquid filling at least part of the casing, a stator, said shaft having an axial passage opening at its lower end and extending above the rotor, and a pump at the upper end of the passage and near the upper end of the rotor structure for drawing the liquid from the lower end of the shaft for circulation of liquid downward through the clearance space between the rotor and stator, the combination therewith of: a heat exchanger of tubular form carried at the lower end of the casing, the interior of the exchanger being in communication with said liquid and the exterior surface of the tubular heat exchanger being exposed on the exterior of the casing; a removable cover for the lower end of the tubular heat exchanger; an upwardly domed substantially annular member having an end opposite its domed portion fixed relative to the cover and defining with the interior of the exchanger a restricted annular passage, the lower end opening of the shaft communicating with the interior of said domed tubular member and via its domed end; there being one or more ports at the end of the tubular member remote from the domed end to define a sinuous path for liquid.

3. In combinations: a casing; a rotatable structure including a shaft and disposed in the casing; a liquid within the casing; a sleeve structure forming a journal bearing for the shaft and having an open portion intermediate the outer ends of the structure, the bearing surfaces of the structure having helical grooves starting at the opening and in communication therewith; a motor structure entirely enclosed by the casing and including a rotor exposed to the liquid; and means for conducting liquid from the casing to said opening; the directions of the grooves being such as to cause the liquid to be moved by aid of the shaft rotation in opposite directions from the opening and respectively toward the outer ends of the sleeve structure, whereby casing liquid is circulated through the grooves for lubrication purposes.

References Cited in the file of this patent

UNITED STATES PATENTS

| | | |
|---|---|---|
| 1,368,998 | Barr | Feb. 22, 1921 |
| 2,001,649 | Arutunoff | May 14, 1935 |
| 2,043,236 | Conant | June 9, 1936 |
| 2,120,914 | Vogel | June 14, 1938 |
| 2,467,586 | Gillen | Apr. 19, 1949 |
| 2,568,548 | Howard | Sept. 18, 1951 |
| 2,674,702 | Arutunoff | Apr. 6, 1954 |
| 2,735,026 | Moerk | Feb. 14, 1956 |

FOREIGN PATENTS

| | | |
|---|---|---|
| 672,001 | Great Britain | May 14, 1952 |
| 781,085 | Great Britain | Aug. 14, 1957 |